United States Patent [19]
Calandra et al.

[11] 3,858,930
[45] Jan. 7, 1975

[54] SAFETY VEHICLE SEAT SYSTEM AND TRIGGER MEANS FOR THE SAME

[76] Inventors: Donald A. Calandra, 130 Wellingwood, Williamsville, N.Y. 14221; Vincent Dirubbio, Hances Pt., North East, Md. 21901; Joseph R. Vallone, deceased, late of East Amherst, N.Y. 14051, by Irene S. Vallone, administratrix, 7091 Transit Rd., East Amherst, N.Y. 14051

[22] Filed: July 11, 1972

[21] Appl. No.: 270,699

[52] U.S. Cl. ......... 296/65 A, 280/150 AB, 297/216
[51] Int. Cl. ............................................ B60r 21/10
[58] Field of Search ..... 296/65 A; 180/91; 297/216; 280/150 AB

[56] References Cited
UNITED STATES PATENTS

| | | | |
|---|---|---|---|
| 2,433,950 | 1/1948 | Henderson | 296/65 A |
| 2,736,566 | 2/1956 | Hartl | 296/65 A X |
| 2,789,650 | 4/1957 | Krous | 296/65 A |
| 2,978,273 | 4/1961 | Racine | 296/65 A |
| 3,547,467 | 12/1970 | Pociask | 180/91 X |
| 3,625,541 | 12/1971 | Frazier | 280/150 AB |

*Primary Examiner*—David Schonberg
*Attorney, Agent, or Firm*—Christel & Bean

[57] ABSTRACT

A seat is mounted in a vehicle for movement from a normal position to a passenger restraining or protective position, in particular the seat is guided for movement of the seat bottom portion in a generally horizontal direction and then in a generally upwardly inclined direction. The seat is moved by a motive power means in the form of a pneumatic cylinder and a gas generating means which releases gas with an explosive force when activated to move the piston rapidly along the cylinder. The motive power means is activated in response to impact with the vehicle at or above a predetermined magnitude by a trigger means comprising an actuator means, for example a first spring-biased member, movable from an inactive position to an active position causing operation of the motive power means, control means, for example a second spring-biased member, normally holding or engaging the actuator means in the inactive position and operative to release the actuator means for movement to the active position, and means for operating the control means in response to impact with the vehicle. The operating means preferably comprises an impact-responsive bumper on the vehicle operatively connected to an hydraulic circuit which, in turn, causes movement of the control means in response to impact.

11 Claims, 13 Drawing Figures

SAFETY VEHICLE SEAT SYSTEM AND TRIGGER MEANS FOR THE SAME

BACKGROUND OF THE INVENTION

This invention relates to automotive vehicles, and more particularly to automotive passive restraint systems and triggering means which operate to protect the vehicle occupants against injury due to collision or impact of the vehicle against another vehicle or a stationary object.

It is well known that personal injuries in the case of front end collisions of automotive vehicles are caused mainly by the occupant being thrown forwardly against the windshield or a portion of the vehicle lying forwardly of the occupant. Various expedients have been proposed to prevent this injurious forward movement of the occupants of a vehicle.

In recent times, passive restraint systems have been developed which operate automatically upon collision or impact thereby requiring no effort on the part of the vehicle driver or passenger for their operation. For example, safety seat arrangements have been proposed whereby the passenger seat or seats are moved automatically from a normal position to an occupant restraining position to overcome or nullify the normal tendency of passengers to be thrown forwardly off the seat and against injury inflicting obstructions when a collision or impact occurs. It is vital in the operation of passive restraint systems such as a safety seat arrangement that the restraining member, for example the seat, execute its movement within the shortest possible time, since only a fraction of a second is available between the first impact of collision and the time when a passenger will have moved too far forwardly to be safely restrained. Prior art safety seat arrangements which utilize the inertia of the collision or impact to initiate or cause movement of the seat are limited in speed of movement by a factor directly dependent upon the magnitude of the initial reaction. Related to this consideration is effective and fast triggering of the passive restraint system. Triggering should occur only in response to collision or impact at or above a predetermined magnitude, and it would be highly desirable to provide a system wherein triggering occurs before the vehicle main structure or frame deforms. In addition, since safety measures required by government standards are becoming more numerous, safety seat arrangements and other passive restraint systems must be compatable with such requirements.

SUMMARY OF THE INVENTION

It is therefore an object of this invention to provide a new and improved automotive vehicle protective seat for moving a passenger from a normal position to a protective position in response to an impact on the vehicle.

It is a particular object of this invention to provide such a protective seat which is moved sufficiently fast so that the passenger is not moved by the impact relative to the seat by an amount which is dangerous.

It is a particular object of this invention to provide such a protective seat which is moved by independent motive power means rather than relying on the inertia of the impact or collision.

It is a further object of this invention to provide, in an automotive vehicle passive restraint system such as a safety seat system wherein the seat is moved in response to impact by a motive power means, a new and improved means for triggering the motive power means.

It is a particular object of this invention to provide such a triggering means which operates relatively fast in response to impact yet which is fail-safe against accidental operation.

It is a particular object of this invention to provide such a triggering means which is adjustable for operation at selected levels of impact and which is relatively simple in construction and operation.

The present invention provides a vehicle passive restraint system in the form of a seat which in response to collision or impact at or above a predetermined magnitude is moved from a normal position to an occupant restraining or protective position during which movement the seat bottom moves first in a generally horizontal direction and then in a generally upwardly inclined direction. The seat is moved by motive power means comprising means for generating or releasing gas at extremely high pressure or force for operating a pneumatic cylinder connected to the seat. The motive power means is activated by trigger means including an actuator means controlling the power means, a control means operatively associated with the actuator means, and means preferably comprising an impact responsive bumper and hydraulic circuit for moving the control means in response to impact thereby operating the power means.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENT

Figure 1:
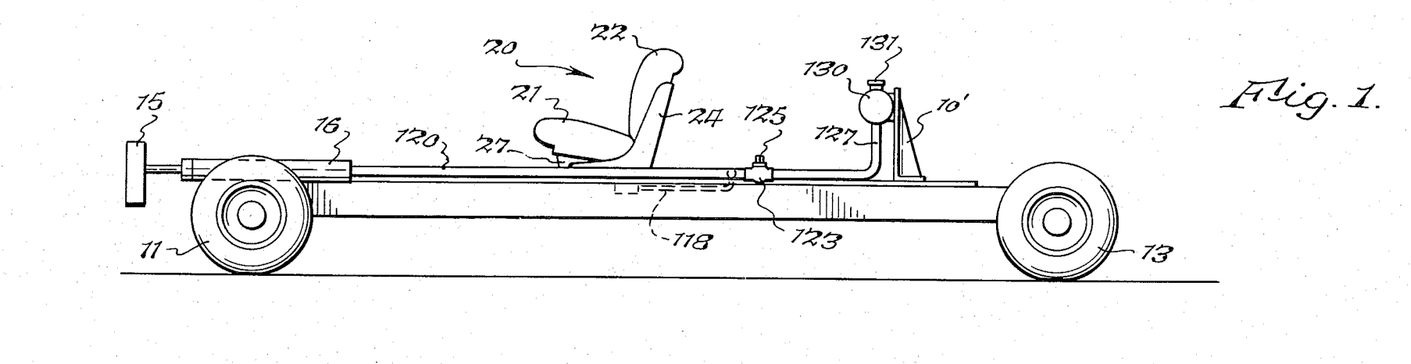
FIG. 1 is an elevational view with parts removed of a vehicle provided with a safety-seat system according to the present invention.
Figure 2:
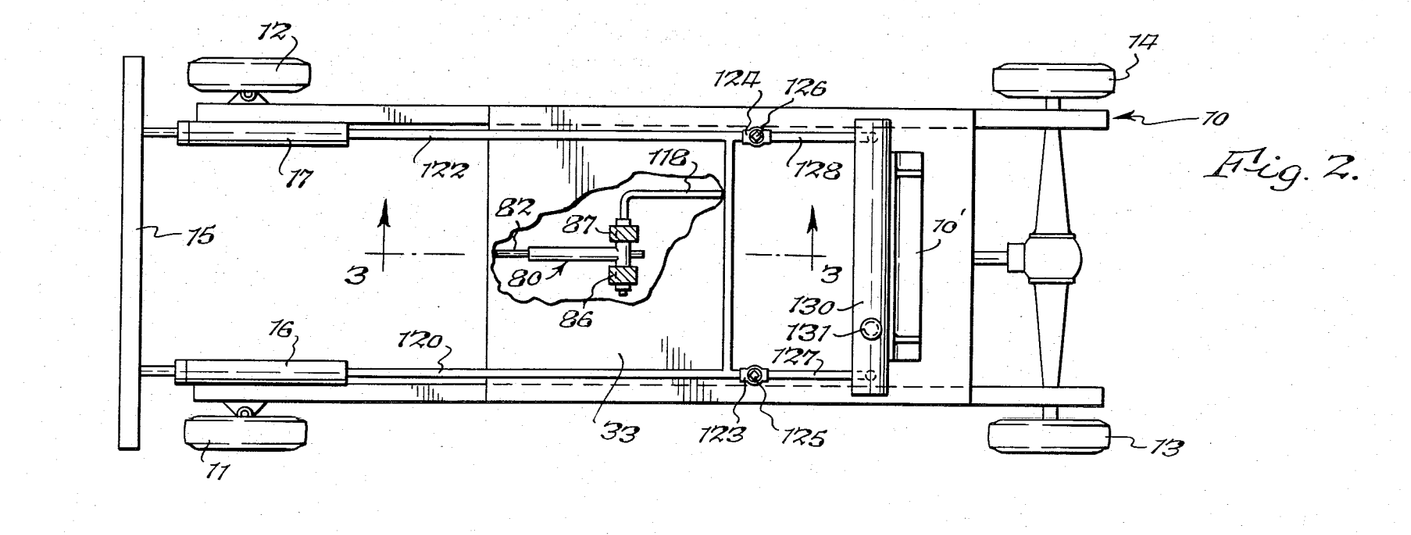
FIG. 2 is a fragmentary plan view of the vehicle of FIG. 1.

In the drawing like characters of reference denote like parts and, referring first to FIGS. 1 and 2, the numeral 10 designates generally a conventional vehicle chassis frame including wheels 11–14. In FIG. 1 the numeral 15 designates an energy absorbing bumper which is connected to the front end of vehicle 10 by biasing means such as hydraulic cylinders 16 and 17 which normally urge bumper member 15 resiliently forward. Within vehicle 10 there is a seat 20 including a seat bottom portion 21 and a back portion 22.

Figure 5:
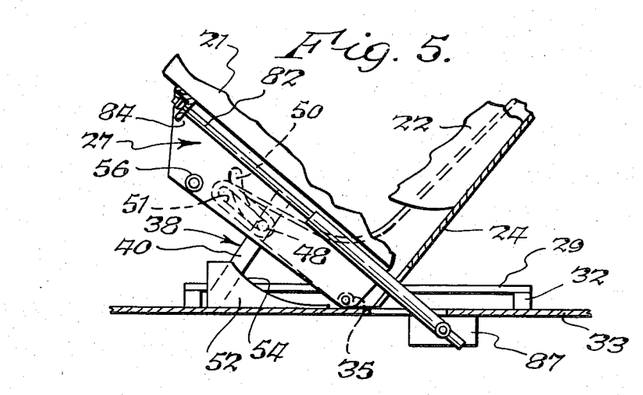
FIG. 5 is a view similar to that of FIG. 3 but showing the seat in a passenger restraining or protective position.
Figure 6:
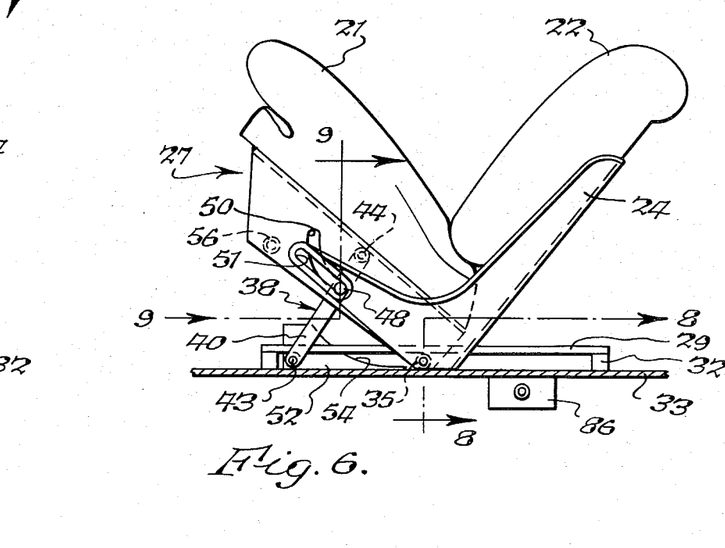
FIg. 6 is a view similar to FIG. 4 but showing the seat in a passenger restraining or protective position.

In accordance with this invention seat 20 is mounted for movement from a normal position as shown in FIG. 1 to a passenger restraining or protective position as shown in FIG. 6, in particular for movement first in a generally horizontal and forward direction and then in a generally upwardly inclined direction. Referring now to FIGS. 3–9, seat 20 has a pair of side frame members 24, 25 secured to seat back 22, and the seat bottom 21 is mounted on a pair of base members 27, 28. Each of the base members 27, 28 is in the form of a channel member with the base or web thereof being secured to the lower surface of seat bottom 21. Each base member 27, 28 has a pair of flanges or legs spaced apart a distance sufficient to fit over a corresponding one of a pair of guide members 29, 30 disposed parallel to the longitudinal axis of vehicle frame 10. Each guide member comprises a strip or bar mounted in spaced relation by post or spacer members 32 at each end thereof to a base or supporting plate 33 for the seat mechanism which plate 33 is mounted on the vehicle floor.

Figure 7:
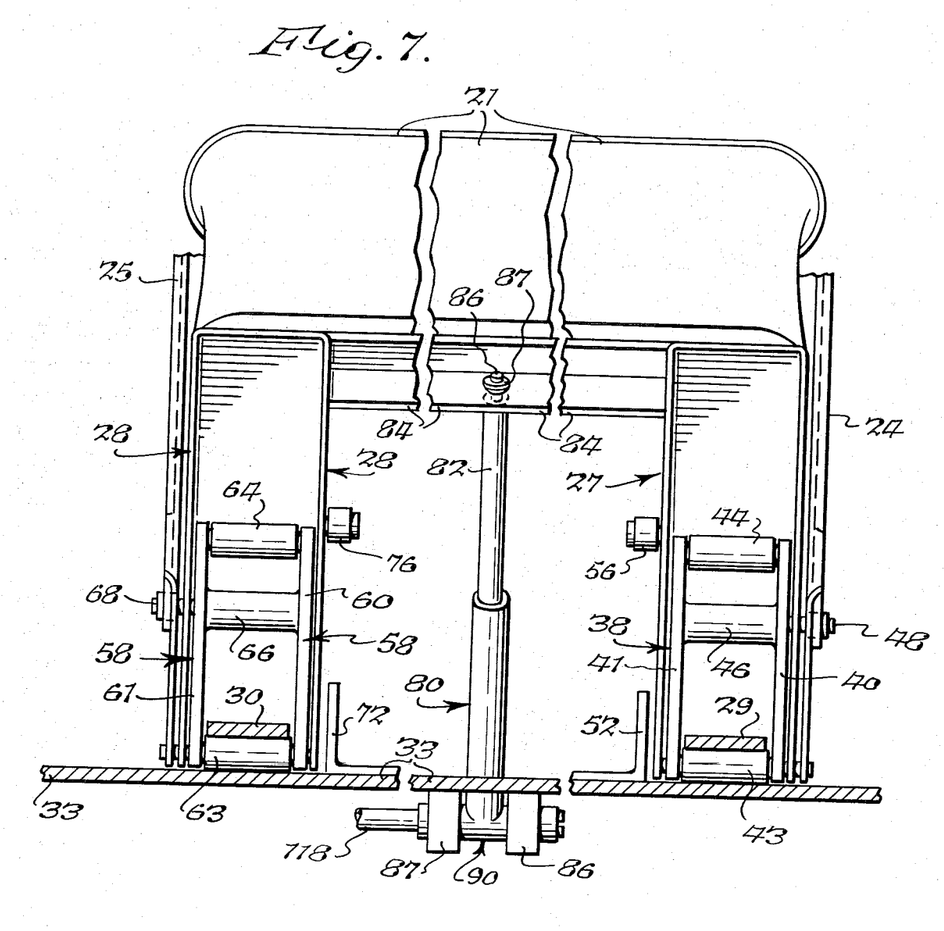
FIG. 7 is a fragmentary front elevational view, partly in section, showing the seat and associated mechanism of the present invention in a passenger restraining or protective position.
Figure 8:
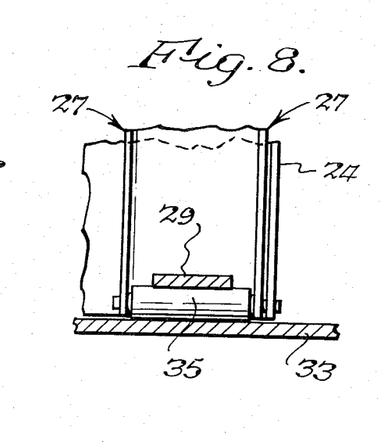
FIG. 8 is a fragmentary sectional view taken about on line 8—8 of FIG. 6.
Figure 9:
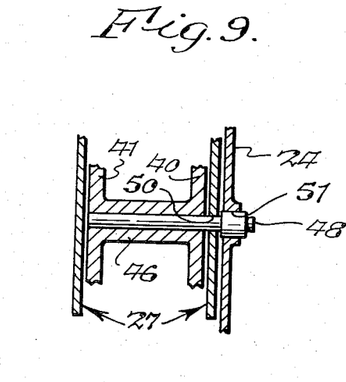
FIG. 9 is a fragmentary sectional view taken about on line 9—9 of FIG. 6.

According to the present invention there is provided first roller means in the form of rollers 35 connected to seat 20 adjacent the lower rear portion thereof, in particular each of two rollers 35 is connected to the lower rear portions of each of base members 27, 28 and side frame members 24, 25, respectively, and located so as to slideably engage corresponding ones of guide members 29, 30. As shown in FIG. 8, rollers 35 are positioned between the corresponding guide member 29, 30 and plate 33 and are movable along the space defined therebetween. There is also provided link means movably connected to seat 20 and slidably engaging guide members 29, 30. In particular, a first link 38 comprises a pair of spaced apart parallel bars 40, 41 joined together at each end by rollers 43, 44. Link 38 is received within base member 27 and bars 40, 41 are spaced apart a distance slightly less than the distance between the legs or flanges of base member 27 and slightly greater than the width of guide member 29 as illustrated in FIG. 7. One end of link 38 extends from base member 27 and the corresponding ends of bars 40, 41 straddle guide member 29 with roller 43 being positioned between guide member 29 and plate 33 so as to be movable along the space defined therebetween. Link 38 further comprises a spacer member 46 secured between bars 40, 41 and a pin or shaft member 48 is threadably connected in bar 40 and member 48 and projects or extends outwardly from link 38, in particular from bar 40. Pin member 48 is slidably received in an arcuate slot 50 provided in the outer flange or leg of base member 27, and pin 48 also is slidably received in a linear slot 51 provided in seat frame member 24.

There is included also a guide means in the form of bracket 52 which is generally L-shaped and has one leg thereof mounted on plate member 33 in the space between base members 27, 28 whereby the other leg thereof is disposed vertically and spaced a short distance from the inner leg or flange of base member 27. Bracket 52 is located near the end of guide member 29 adjacent the front of seat 20. The vertical leg of guide bracket 52 is provided with an arcuate edge 54 disposed toward the rear of seat 20 and having the same degree of curvature as arcuate slot 50. A second roller means in the form of roller 56 is connected to base member 27, in particular roller 56 is connected to and extends inwardly from the inner flange or leg of base member 27, adjacent the lower front portion thereof as shown in FIG. 7. Roller 56 is positioned so as to engage and ride along arcuate edge 54 during initial movement of seat 20 from a normal position to a protective position.

An identical arrangement is provided in association with base member 28 and guide member 30 and includes a second link 58 comprising spaced apart parallel bars 60, 61 joined together at each end by rollers 63, 64 with roller 63 being positioned between guide member 30 and plate 33 so as to be movable along the spaced defined therebetween. A spacer member 66 holds a pin member 68 which is slidably received in an arcuate slot provided in the outer flange of base member 28 which slot is in alignment with and has the same degree of curvature as slot 50 in base member 27. Pin 68 also is slidably received in a linear slot provided in seat frame member 25 which slot is in alignment with the linear slot 51 in frame member 24. A guide bracket 72 has an arcuate surface for guiding a roller 76 connected to base member 28.

Figures 10, 11, 12, 13:
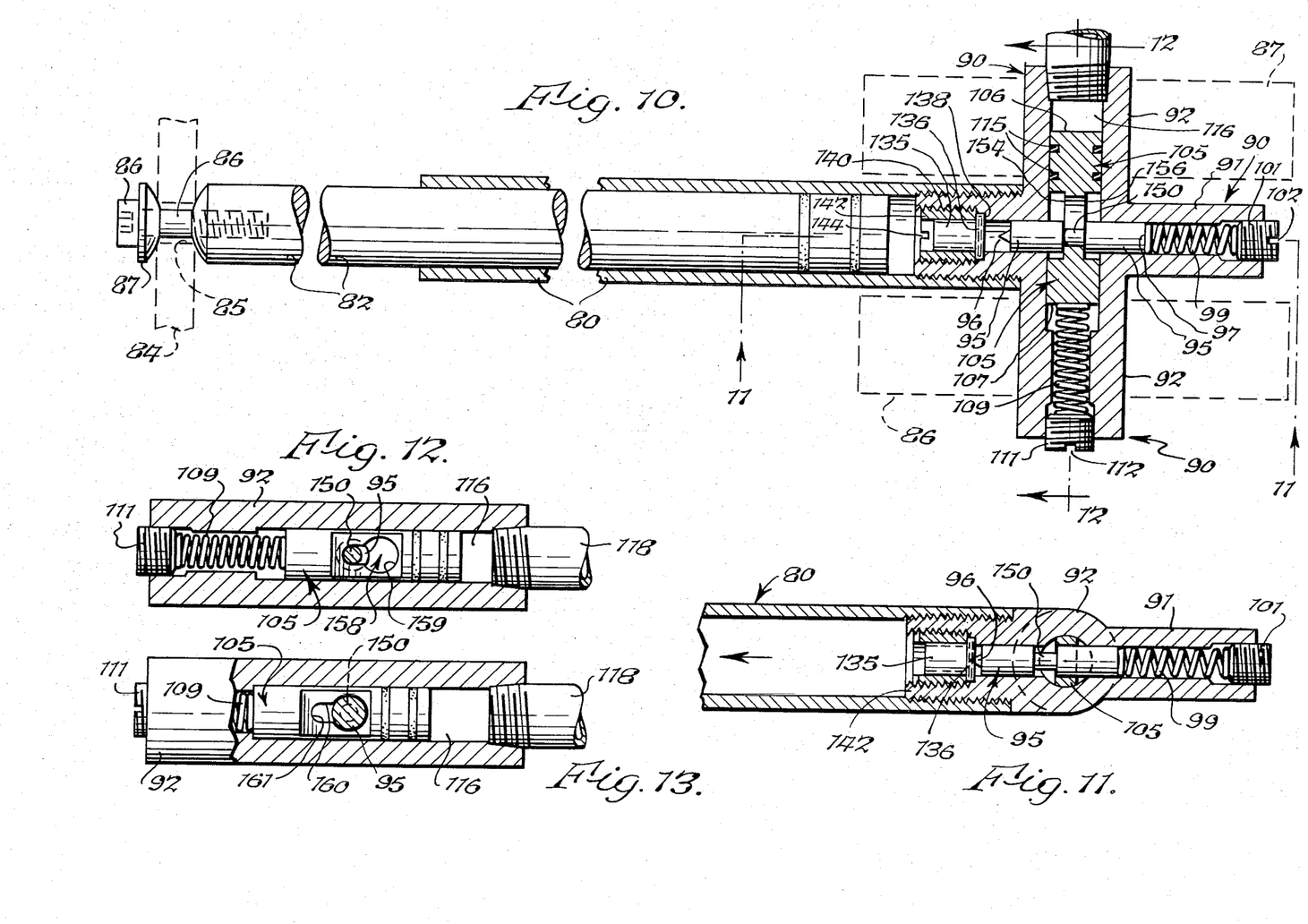
FIG. 10 is a longitudinal sectional view with parts removed taken about on line 10—10 of FIG. 3.
FIG. 11 is a sectional view taken about on line 11—11 of FIG. 10.
FIG. 12 is a sectional view taken about on line 12—12 of FIG. 10.
FIG. 13 is a view similar to FIG. 12 but illustrating a position of operation of parts thereof.

The safety seat mechanism of the present invention does not rely on the force of inertia developed by a collision or impact for moving the occupants from a normal position to a protective or restraining position. The present invention provides motive power means connected to seat 20 for moving the seat from a normal position to a protective position in response to operation of a trigger means which, in turn, is operated in response to an impact or collision. A preferred form of motive power means is shown in FIGS. 7 and 10 and comprises a pneumatic cylinder 80 having a piston or rod 52 which is connected at the external or outer end thereof to the forward end of seat 20 and movable within cylinder 80. One arrangement for movably connecting the end of rod 82 to seat 20 comprises an angle iron member 84 fixedly mounted to seat 20 at the bottom forward end thereof. Member 84 is provided with an aperture 85 for receiving a bolt 86 and spherical washer 87 which bolt is connected in a curved or partially spherical end surface 88 of rod 82. The diameter of bolt 86 is less than the diameter of aperture 85 and this together with surface 88 and spherical washer 87 provides a movable connection between the end of rod 82 and member 84 analogous to a ball joint coupling. Piston 82 is moved rapidly within cylinder 80 in response to a sudden release of gas from a gas generating means in response to operation of a triggering means upon impact with the vehicle in a manner which now will be described.

A triggering means according to the present invention includes a housing 90 which preferably is of a one-piece or unitary construction including a first generally cylindrical portion 91 and a second generally cylindrical portion 92 which meets portion 91 at substantially a right angle. Portions 91 and 92 are hollow so as to define first and second intersecting chambers within housing 90. Opposite ends of cylindrical portion 92 are supported in corresponding bearing blocks 86, 87 mounted on the undersurface of the vehicle floor, and cylinder 80 extends upwardly through aligned openings provided in the vehicle floor and plate 33.

The triggering means of the present invention comprises actuator means in the form of a flat member 95 movable along the chamber defined within housing portion 91 from an inactive position to an active position causing operation of the motive power means. In preferred form member 95 comprises a generally solid cylindrical rod provided with a pointed tip 96 at one end thereof. The outer end of member 95 comprises a relatively flat end surface 97. A first biasing means in the form of spring 99 urges member 95 toward the active position. In particular, one end of spring 99 contacts or engages end face 97, and the other end of spring 99 contacts or engages the end surface of a plug member 101 which is threadably connected in the corresponding end of housing portion 91. Plug 101 is provided with a notch 102 whereby it can be conveniently rotated for removal and also for adjusting the biasing force provided by spring 99 in a manner which presently will be described.

The triggering means of the present invention further comprises control means normally holding the actuator means in the inactive position and operative to release the actuator means for movement to the active position. In preferred form the control means comprises a second member 105 movable along the chamber defined within housing portion 92 into and out of engagement with the first member 95. Member 105 is generally solid cylindrical in shape along the major portion of its length and terminates in end faces 106, 107 disposed in parallel planes substantially perpendicular to the axis of member 105. A second biasing means in the form of spring 109 normally urges member 105 into engagement with member 95 to hold member 95 in the inactive position thereof. In particular, one end of spring 109 is in contact with or engagement with end surface 107 of member 105. The other end of spring 109 is in engagement or contact with a plug member 111 which is threadably connected in the corresponding end of housing portion 92. Plug member 111 is provided with a notch 112 in a manner similar to that of plug 101 to facilitate removal of plug 111 as well as to permit adjustment of the biasing force or tension provided by spring 109. The manner in which members 95 and 105 engage and disengage each other will be described in detail presently.

The triggering means of the present invention finally comprises means for operating the control means in response to impact with the vehicle, in particular means for coupling the impact responsive means to member 105 for moving member 105 out of engagement with member 95 in response to operation of the impact responsive means whereby in response to an impact with the vehicle, the first member 95 is moved to the active position. This, in turn, causes operation of the motive power means thereby moving seat 20 to a passenger restraining or protective position. The portion of member 105 adjacent surface 106 is in fluid sealing relation with the inner wall of the cylindrical portion 92 as provided by O-rings 115. End surface 106 of member 105 together with the inner wall of portion 92 defines a chamber 116 for receiving hydraulic fluid, and a conduit or line 118 having a threaded termination is connected in the end of chamber 116 for placing chamber 116 in fluid communication with the impact responsive means. In particular, and referring now to FIG. 2, line 118 connects into a line or conduit 119 which, in turn, is connected to each of a pair of lines or conduits 120 and 122 connected to cylinders 16 and 17, respectively. Lines 120 and 122 are connected rearwardly of line 119 in FIG. 2 to ports of valves 123 and 124, respectively. Valves 123 and 124 are of the manually operated type in the present illustration and are provided with handles or knobs 125 and 126, respectively. The other ports of valves 123, 124 are connected by lines 127 and 128, respectively, to a reservoir 130. Reservoir 130 is provided with an inlet 131 for admitting air under pressure thereto for a purpose which presently will be described. While the combination of bumper 15 and hydraulic circuit is preferred, alternative operating means can be employed such as small pneumatic impact sensing devices mounted on the vehicle together with fluid coupling means to the control means, or such as electrical force sensing devices appropriately mounted on the vehicle and electrically coupled to means for operating the control means.

FIG. 10 illustrates a preferred form of gas generating means according to the present invention. The gas generating means comprises a container of percussively activated material which in response to a percussive force provided by impact from member 95 gives rise to an explosive reaction releasing gas to force piston 82 along cylinder 80. A relatively thin-walled container 135 having a base 136 closing one end thereof and open at the other is fitted within body portion 91 in a manner such that base 136 is a predetermined distance from tip 96 of member 95 in the latched or inactive position thereof. In preferred form, container 135 comprises a 30-30 caliber shell with the bullet and powder removed and replaced by a mixture consisting of 300 milligrams of black powder or gun powder and 500 milligrams of cellulose nitrate together with a wadding or packing fitted in the open end of shell 135. The addition of cellulose nitrate generates gas at sufficient pressure upon explosion of the mixture to provide the force needed to move seat 20 and the occupant from a normal to a protective position.

Container or shell 135 is assembled within body portion 91 in the following manner. The end of portion 91 connected to cylinder 80 has a slightly enlarged inner diameter thereby providing an annular shoulder 138. Base 136 of shell 135 has a diameter slightly greater than that of the wall of shell 135 thereby defining an annular lip. Shell 135 is placed within body portion 91 so that the annular lip adjacent base 136 rests against annular shoulder 138. The inner surface of body portion 91 beyond shoulder 138 is provided with threads 140, and an externally threaded sleeve 142, the inner diameter of which is slightly larger than the outer diameter of the shell wall portion, is threaded in body portion 91 so as to fit over the wall portion of shell 135 and firmly urge the periphery of base 136 against annular shoulder 138. Installation of sleeve 142 is facilitated by a pair of notches or recesses, one of which is designated 144.

Member 95 preferably is cylindrical in shape having a relatively flat end face 97 and an opposite end face at which there is formed a sharp, pointed tip 96. Member 95 is formed with a reduced diameter cylindrical portion 150 approximately midway along the length of member 95. The axial length and diameter of portion 150 are related to certain dimensions of a portion of member 105 which will now be described.

Member 105, as shown in FIGS. 12 and 13, also is cylindrical in shape along a major portion thereof having flat coplanar end faces 106, 107, and member 105 is provided with annular grooves 152 in the neighborhood of end surface 106 for receiving 0-rings 115 shown in FIG. 10. The cylindrical body of member 105 is formed to provide a pair of flat parallel faces 154 and 156 approximately midway along the length of member 105 as shown in FIG. 10 which faces 154, 156 are perpendicular to end faces 106, 107. An opening 158 is provided through the portion of member 105 including faces 154, 156 and extends through member 105 in a direction perpendicular to the planes of faces 154, 156. Opening 158 includes a substantially circular portion 159 and a generally elongated portion 160 extending from portion 159 in a direction parallel to the axis of member 105 and terminating in a semicircular portion 161. The diameter of portion 159 is slightly larger than the outer diameter of member 95 thereby allowing member 95 to pass through portion 159 when it is in alignment therewith and when the axes of members 95 and 105 are mutually perpendicular. The semicircular portion 161 has a diameter which is slightly greater than the diameter of portion 150 of member 95 so that portion 150 is slidably movable along portion 160 when member 105 is moved relative to member 95 in a direction parallel to the longitudinal axis of member 95.

Referring now to FIGS. 10 and 12, members 95 and 105 are illustrated in the inactive position of member 95 wherein it is in engagement with member 105. In this position, portion 150 of member 95 occupies portion 160 of opening 158 in member 105, and the annular surface or shoulder between portion 150 and the outer surface of member 95 contacts or abuts face 156 of member 105. Thus, members 95 and 105 are in engagement and movement of member 95 is prevented.

Movement of member 105 toward the left as viewed in FIG. 12 in response to an increase in fluid pressure in chamber 116 will place portion 159 of opening 158 in registry with the larger diameter portion of member 95 thereby permitting member 95 to be propelled through the portion 159 by the force of spring 99 shown in FIG. 13 and illustrated further in FIG. 11.

Figures 3, 4:
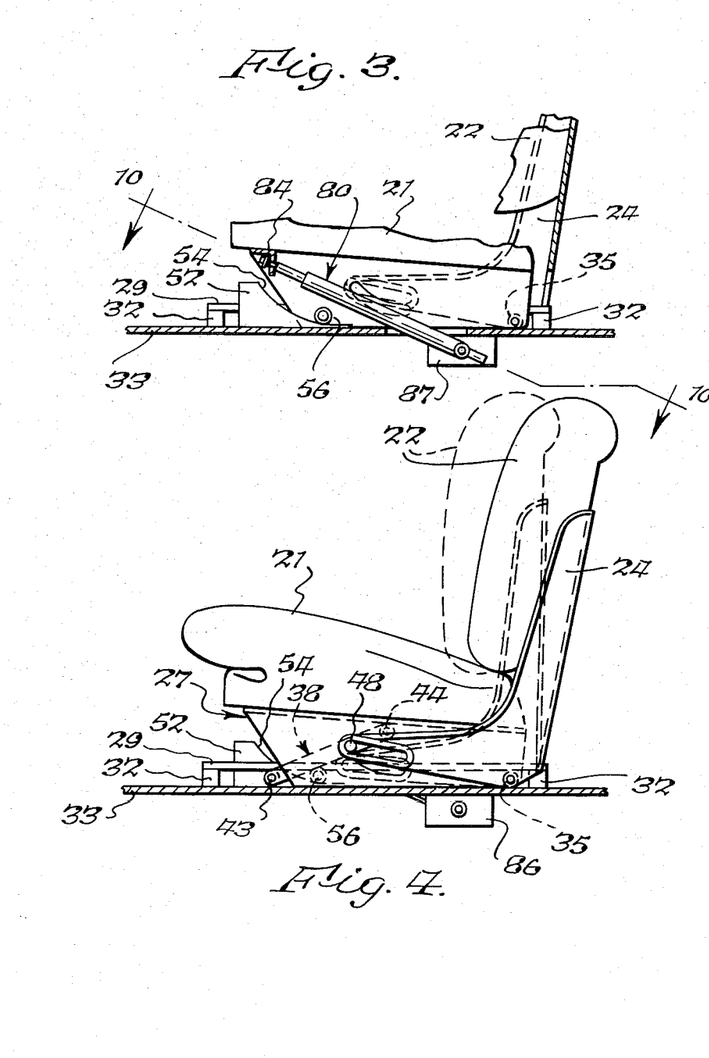
FIG. 3 is a vertical sectional view taken about on line 3—3 of FIG. 2.
FIG. 4 is a fragmentary elevational view showing the seat of the present invention as it would appear in a normal position.

The system of the present invention operates in the following manner. In response to an impact or collision between the vehicle and another vehicle or object, the force of the impact acts on impact responsive means or energy absorbing bumper 15 causing it to move toward the vehicle frame 10. This movement is against the steady state condition of the fluid in hydraulic cylinders 16, 17 thereby causing an increase in the pressure within cylinders 16, 17 which, in turn, is communicated by the hydraulic system including lines 120, 122, line 119 and line 118 to chamber 116 of the triggering means shown in FIGS. 10–13. The lines of the hydraulic system have relatively large diameters thereby providing a fast response in the form of a rapid change in pressure upon movement of bumper 15. The resulting increase in fluid pressure within chamber 116 develops a force acting on end face 106 of member 105 sufficient to overcome the force or spring 109 acting on end face 107. As a result, member 105 is moved downwardly as viewed in FIG. 10 or to the left as viewed in FIGS. 12 and 13 thereby disengaging it from member 95. Then member 95 is forced or propelled rapidly by the force of spring 99 acting on member 95 through the opening 159 in member 105 causing pointed tip 96 to hit base 136 of cartridge 135. This action is analogous to that of a firing pin in a gun. The charge within shell 135 explodes, releasing gas under high pressure which acts rapidly on piston 82 forcing it at high speed and force along cylinder 80. Piston 82, in turn, moves seat 20 from normal position as shown in FIGS. 1, 3 and 4 to a passenger restraining or protective position as shown in FIGS. 5 and 6. In particular, seat 20 is moved by cylinder rod 82 initially in a horizontal, forward direction with rear rollers such as roller 35 and front rollers 43, 63 moving along the space between base 33 and the respective guide members 29, 30. Seat 20 begins moving in an upwardly inclined direction when rollers 56, 76 engage the arcuate edges of guide brackets 52, 72. Brackets 52, 72 can be adjusted forwardly or rearwardly of their positions shown in FIGS. 3–6 depending upon the amount of initial forward movement of seat 20 that is desired prior to movement in an upwardly inclined direction. This, in turn, depends upon the level of impact or collision force with the vehicle at which seat 20 is to be operated. In particular, it has been determined that when the system of the present invention is to be triggered at relatively low levels of impact, little or no initial forward movement of seat 20 is desired. On the other hand, at relatively high impact levels it is desired to have relatively more initial forward movement of seat 20 to compensate for effect of inertia of the human body.

As roller 56 and 76 begin their movement upwardly along the arcuate edges of guide brackets 52 and 72, respectively, seat 20 is moved in an upwardly inclined direction which is furthered by the movement of link members 38, 58. In particular, links 38, 58 move from a position such as that of link 38 shown in FIG. 4 to the position thereof shown in FIG. 6. Pins 48 and 68 move along the arcuate slots of base members 27 and 28, respectively, such as slot 50, and rollers 44 and 64 of links 38 and 58, respectively, move along the undersurface of the web or bore portions of base members 27 and 28, respectively. At the same time, rollers 43 and 63 of links 38 and 58, respectively, move along the spaces between guide members 29 and 30, and when rollers 43, 63 are stopped by posts 32, seat 20 is moved further upwardly about a pivot axis through pin members 48, 68 to the position of FIG. 6. A pair of stop members (not shown) are provided between guide members 29, 30 and plate 33 for engaging the rear rollers of seat 20 such as roller 35 when seat 20 reaches the position of FIG. 6. The combination of guide brackets 52, 72 and rollers 56, 76 for guiding seat 20 during the beginning of movement in an upwardly inclined direction together with pins 48, 68 slidably received in arcuate slots of base members 27, 28 allows seat 20 to move forwardly and then upwardly without requiring that the rear surface of seat 20 be tilted very far backwardly into the rear passenger area of the vehicle. According to a preferred mode of the present invention, the dimensions of links 38, 58 and locations of pins 48, 68 together with the length and degree of curvature of the arcuate edges of guide brackets 52, 72 and of slot 50 in base member 27 and the corresponding slot in base member 28 are such that in the final position of seat 20 as shown in FIG. 6, the rear bottom edge thereof is moved about 11 inches in a horizontal direction and the front edge thereof is moved ahead about 3 inches from its original position. In addition, when seat 20 reaches the final position the angle between bottom 21 and back 22 is decreased slightly, as indicated by the broken line portion in FIG. 4.

According to a preferred mode of the present invention, spring 99 is rated at 10 pounds and spring 109 is rated at 85 pounds. The length of travel of member 95 from an inactive to an active position is about one quarter of an inch, although this distance can vary with changes in forces provided by springs 99 and 109 and with changes in the charge contained in shell 135. cylinder 80 is formed of cold rolled steel and has an inner diameter of 1 inch and a thickness of about three-eighths inch. Valves 123, 124 together with the amount of air pressure introduced through inlet 131 into reservoir 130 control the level of impact force acting on the force sensing means or bumper 15 which will cause triggering of the system. In other words, these adjustments control the degree of movement of bumper 15 relative to cylinders 16, 17 requires to trigger the system. If both valves 123 and 124 are closed, triggering of the system occurs at the lowest possible level of impact against bumper 15. The greater the amount by which valves 123, 124 are opened, the higher will be the level of impact or force against bumper 15 required to trigger the system. Air pressure is introduced to reservoir 130 at a maximum pressure of approximately 85 pounds. The system of the present invention has been found to cause movement of seat 20 from a normal position to a protective position within 0.040 seconds. Thus seat 20 is moved sufficiently fast so that the occupant is not moved by the impact relative to the seat by an amount which is dangerous. Triggering of the system, that is movement of actuator means 95 in response to an impact on bumper 15 of a magnitude sufficient to cause triggering, has been found to occur within a time less than the interval between impact and deformation of the vehicle main frame structure. Furthermore, utilizing the force of an impact to cause a change in pressure in an adjustable hydraulic circuit to operate a mechanical switch insures against inadvertent or accidental operation of the system by minor impacts or when the vehicle encounters bumps or holes in the road.

In the present invention, movement of member 95 from an inactive to an active position is utilized to cause the pin or pointed tip 96 to hit a primer causing an explosive release of gas to move piston 82. The movement of member 95 from an inactive to an active position alternatively could be employed to move a pair of electrical contacts into engagement with each other to complete an electrical circuit which, in turn, would cause operation of a motive power means. Another alternative would be to employ member 95 with pointed tip 96 to pierce a hole in an air valve of a contained gas tank, in a manner similar to the triggering of automobile air bag systems. The triggering means of the present invention will operate in response to any level of impact above that regulated according to the force constant of spring 109 together with the setting of valves 123, 124. The greater the level of impact above the level required for triggering, the faster pressure will build up in the hydraulic system thereby causing a proportionately faster operation of the triggering means. In addition, while the triggering means of the present invention is employed in a safety seat system in the present illustration, it can be employed with equal effectiveness in other passive restraint systems such as air bag and automatic belt systems. The combination of an actuator means movable between inactive and active position under control of a control means which, in turn, is operated in response to impact at or above a predetermined magnitude, preferably including an hydraulic system, operates extremely fast yet is not prone to inadvertent operation. Furthermore, it is adjustable for operation at selected levels of impact yet is relatively simple in construction and operation.

It is apparent that the present invention accomplishes its intended objects. While specific embodiments of the present invention have been described with specificity, this has been done by way of illustration, not limitation.

We claim:

1. In a vehicle passive restraint system, trigger means comprising:
   a. actuator means comprising an actuator member movable from an inactive position wherein said actuator member is spaced out of contact with means for operating said passive restraint system to an active position wherein said actuator member operatively contacts said operating means in a manner causing operation of the passive restraint system and biasing means normally urging said actuator member toward said active position;
   b. control means normally mechanically holding said actuator member in said inactive position spaced out of contact with said operating means and operative to release said actuator member and allow said actuator member to be moved to said active position operatively contacting said operating means; and
   c. means for operating said control means to release said actuator member in response to impact with the vehicle, said operating means comprising force sensing means said fluid circuit means coupled to said control means whereby in response to an impact with the vehicle said force sensing means causes a change in pressure in said fluid circuit means for operating said control means to release said actuator member.

2. Apparatus according to claim 1 wherein said fluid circuit means comprises hydraulic circuit means.

3. Apparatus according to claim 1 wherein said fluid circuit means includes adjustment means for controlling the magnitudes of the changes in pressure resulting from corresponding impact forces whereby said control means is operated only in response to impact forces at or above a predetermined magnitude.

4. In a vehicle passive restraint system, trigger means comprising:
   a. actuator means comprising an actuator member movable from an inactive position to an active position wherein said actuator member engages means causing operation of the passive restraint system and biasing means normally urging said actuator member toward said active position;
   b. control means normally mechanically holding said actuator member in said inactive position and operative to release said actuator member for movement to said active position, said control means comprising a control member movable into and out of engagement with said actuator member and second biasing means urging said control member into engagement with said actuator member to hold said actuator member in said inactive position; and c. means for operating said control means in response to impact with the vehicle.

5. Apparatus according to claim 4 wherein said actuator member extends through an opening in said control member having a shape and size whereby in the normal position of said control member said actuator member is held in said inactive position and when said control member is moved against the force of said second biasing means said actuator member is released for movement through said opening in said control member to said active position.

6. A vehicle passive restraint system comprising:

a. protective means movable from a normal position to a passenger restraining position;

b. motive power means operatively connected to said protective means for moving said protective means to said passenger restraining position; and c. impact responsive triggering means causing operation of said motive power means and comprising force sensing means, coupling circuit means operatively connected to said force sensing means and connected in controlling relation to trigger means having an inactive state and an active state causing operation of said motive power means whereby in response to an impact with the vehicle said force sensing means causes a change in a flow parameter in said coupling circuit means to move said trigger means to the active state to operate said motive power means, and adjustable valve means in said coupling circuit means for controlling the magnitudes of the changes in the circuit flow parameter resulting from impact forces whereby said trigger means is operated only in response to impact forces at or above a predetermined magnitude.

7. Apparatus according to claim 6, wherein said protective means comprises a passenger seat having a bottom portion and a back portion and means mounting said seat in the vehicle for movement from said normal position to said passenger restraining position.

8. Apparatus according to claim 7, wherein said mounting means comprises means guiding said seat for movement of said bottom portion in a generally horizontal direction and guiding said seat for movement of said bottom portion in a generally upwardly inclined direction.

9. Apparatus according to claim 8, wherein said guiding means includes means for adjusting the amount of movement in a horizontal direction prior to movement in an upwardly inclined direction.

10. Apparatus according to claim 6, wherein said motive power means comprises pneumatic cylinder means connected to said protective means and gas generating means activated by said triggering means for introducing gas into said cylinder means at a high pressure.

11. Apparatus according to claim 6, wherein said coupling circuit means comprises hydraulic circuit means and said force sensing means causes a change in pressure in said hydraulic circuit means to move said trigger means to the active state and wherein said adjustable valve means controls the magnitudes of the changes in pressure resulting from impact forces.

* * * * *

UNITED STATES PATENT AND TRADEMARK OFFICE
CERTIFICATE OF CORRECTION

PATENT NO. : 3,858,930
DATED : January 7, 1975
INVENTOR(S) : Donald A. Calandra, Vincent DiRubbio and Joseph R. Vallone, deceased, by Irene S. Vallone, administratrix It is certified that error appears in the above-identified patent and that said Letters Patent are hereby corrected as shown below:

Front Page, [76], line 3, "Dirubbio" should be --DiRubbio--,

Claim 1, line 23, before "control" insert --force sensing means and said--,

Claim 1, line 22, "said" should be --and--.

Signed and Sealed this second Day of December 1975

[SEAL]

Attest:

RUTH C. MASON
Attesting Officer

C. MARSHALL DANN
Commissioner of Patents and Trademarks